United States Patent
Weng et al.

(10) Patent No.: US 9,021,826 B1
(45) Date of Patent: May 5, 2015

(54) WATER ENERGY CONVERSION SYSTEM

(71) Applicant: Her Jiu Technology Co., Ltd., Taichung (TW)

(72) Inventors: Kuo-Liang Weng, Taichung (TW); Chien-Lun Weng, Taichung (TW); Ling-Hua Weng, Taichung (TW); Ching-Ju Weng, Taichung (TW)

(73) Assignee: Her Jiu Technology Co., Ltd., Taichung (TW)

( * ) Notice: Subject to any disclaimer, the term of this patent is extended or adjusted under 35 U.S.C. 154(b) by 0 days.

(21) Appl. No.: 14/205,330

(22) Filed: Mar. 11, 2014

(51) Int. Cl.
  *F28D 5/00* (2006.01)
  *F03B 13/06* (2006.01)
  *F24F 1/00* (2011.01)

(52) U.S. Cl.
  CPC ......... *F03B 13/06* (2013.01); *F24F 2001/0085* (2013.01)

(58) Field of Classification Search
  CPC .................................................. F24F 2001/0085
  USPC ........................................... 62/304, 310–311
  See application file for complete search history.

(56) References Cited

U.S. PATENT DOCUMENTS

2003/0037905 A1* 2/2003 Weng .............................. 165/60

* cited by examiner

*Primary Examiner* — Cassey D Bauer
(74) *Attorney, Agent, or Firm* — Guice Patents PLLC

(57) ABSTRACT

A water energy conversion system includes a control unit, a first gas-water energy conversion device, a second gas-water energy conversion device, a water supply device, a storage tank and a heat source unit. Water for different purposes is supplied by the water supply device that collects and transmits various kinds of water resources. Operations of the storage tank as well as the first and second gas-water energy conversion devices are based on water as the basis and a carrier of energy conversion to provide effective energy conversion and recycling. By further employing the heat source unit, high-efficiency cooling, heat dissipation or heat absorption can be achieved with minimal power and water consumption. Thus, the water energy conversion system is applicable for energy conversion, energy regulation and supply for air of indoors and outdoors of a building to realize effects of water storage and supply, anti-flooding, and energy saving and storage.

10 Claims, 9 Drawing Sheets

WATER ENERGY CONVERSION SYSTEM

BACKGROUND OF THE INVENTION a) Field of the Invention

The invention relates in general to a water energy conversion system, and more particularly to a system that combines water energy conversion with a heat source unit. As such, water resources and energy conversion can be recycled for applications of energy conversion, energy regulation and supply for air of indoors and outdoors of a building, thereby realizing multiple effects of water storage, water supply, anti-flooding and energy storage as well as fully exercising localization application and balance of energy converted from water resources.

b) Description of the Prior Art

Due to consequential damages of human over-exploitation and unrestrained utilization on the limited resources of the earth, global warming, drastic weather changes and extreme weather conditions that further lead to frequent severe disasters are brought upon. As a result of continual natural disasters, human lives and properties are endangered, and certain regions are even faced with inhabitable crisis. In order to save the earth's ecology, those with awareness persistently advocate and appeal the importance of environmental protection as well as water and energy conservation, in the hope of reducing human destruction on the nature and preventing an early arrival of human catastrophe.

Water is a carrier of energy on the earth, and distributes energy all over the world by means of ocean currents, rain and snow. In the recent years, extreme weather conditions, brought about by mostly human activities, have critically affected the ecological natural water cycle. The fall of rain or snow with respect to time and regions are becoming increasingly undistributed, and thus both droughts and floods happening in the same region are no longer a rare occurrence.

Water is an omni-present substance, and is one of the most crucial resources on the earth. One distinctive value of water is its recycling and reuse properties. Under the trend of going-green and water and energy conservation, various kinds of energy and water saving measures and equipments are constantly innovated and launched to the market, and have also gained much attention of many nations. For example, water collecting devices, wind generators and solar generators are hot topics of various water and energy conservation plans. However, the application of the various water and energy conservation plans is mostly restricted to one single purpose and involves recycling by a specific means.

FIG. 1 shows a schematic diagram of a conventional water storage utilization system 1, which primarily provides water for different purposes by a water supply device 11. The water supply device 11 collects redundant water resources as a reserve water source in a storage tank 12. The above method solves issues of water collection and reserve water supply in the shortage of water, and is however incapable of combining or converting other usable resource for reuse and recycling. Base on the law of nature, when an outdoor environment is in a low-energy (low-temperature) condition, a building needs to be in a high-energy (high-temperature) condition in order to keep an indoor environment habitable, meaning that an air conditioning system is required to operate against the natural environment. That is to say, when an outdoor environment is in a high-energy (high-temperature) condition, an air conditioner needs to dissipate heat within the building to outdoors. For example, operations of an air conditioner disposed in a building are reverse to the natural environment, and discharges a greater amount of heat waste as the temperature of the natural environment gets higher, thus imposing even more severe heat pollution to the environment. The above energy conservation measures are incapable of solving such internal energy conversion within a building. As a result, the heat waste not only continues to contaminate the environment, but also cannot be effectively recycled due to the lack of employment of appropriate timings for energy conversion. In contrast, when an outdoor environment is in a low-energy (low-temperature) condition, a building can only capture heat from the low-temperature outdoor environment to provide an indoor environment with warmth. Such behavior that violates with natural conditions is in fact an extremely energy consuming means and also accounts as the culprit of global warming.

Among an outdoor environment of a building lie different types of usable resources and energies. The planning of an air conditioning system should be targeted toward reaching internal energy balance within a building in order to achieve a goal of localization balance.

Therefore, there is a need for a solution that achieves such goal.

SUMMARY OF THE INVENTION

In view of issues of current water and energy applications, it is an objective of the present invention to provide a water energy conversion system. The water energy conversion system utilizes water as a basis for energy conversion. With the immense storage capability of water, energy is stored in a storage tank. In collaboration with operations of first and second gas-water energy conversion devices and a heat source unit, heat exchange is performed between indoor and outdoor environments at appropriate timings. Apart from creating a healthy and comfortable indoor environment, an energy balance with the nature is maintained in accordance with the nature. As such, water resources and energy conversion can be recycled for applications of energy conversion, energy regulation and supply for air of indoors and outdoors of a building, thereby realizing multiple effects of water storage, water supply, anti-flooding and energy storage as well as fully exercising localization application and balance of energy converted from water resources.

To achieve the above objective, a water energy conversion system is provided according to an embodiment of the present invention. The water energy conversion system at least includes a control unit, a first gas-water energy conversion device, a second gas-water energy conversion device, a water supply device, at least one storage tank, and a heat source unit.

The control unit controls operations of the entire system, and is connected to a power supply system.

The first gas-water energy conversion device includes a housing, a cooling fan, a main tube bank, an air pre-cooling water tube bank, a water vaporizer, and a water collecting chamber.

The housing, being a hollow cylindrical body, includes an accommodating space therein, an air outlet at a top portion thereof, and at least one air inlet at a periphery of the housing.

The cooling fan is disposed at the air outlet of the housing, and is controlled by the control unit.

The main tube bank is disposed below the cooling fan, and is formed by at least one coil. The coil has a water entrance end connected to a first water discharging branch pipe, and a water exit end connected to a first water receiving branch pipe.

The air pre-cooling water tube bank is disposed at one side below the main tube bank, and is formed by at least one coil. The coil has a water entrance end connected to a main connecting pipe, and a water exit end connected to a water sprinkling pipe. The water sprinkling pipe is provided with at least one water sprinkling hole.

The water vaporizer, installed right below the main tube bank, is a mist cooling device that generates an endothermic effect through water vaporization. The water vaporizer has at least one side located at a water sprinkling region of the water sprinkling pipe, and is provided with a water collecting pan below. The water collecting pan is connected to a water collecting connecting pipe.

The water collecting chamber, disposed below the water vaporizer, is an enclosed chamber and is in communication with the water collecting pan via the water collecting connecting pipe. The water collecting chamber is connected to the main connecting pipe via a water delivering connecting pipe provided with a fifth water pump. The fifth water pump is connected to and controlled by the control unit.

The second energy conversion device internally includes a wind discharging channel and a wind receiving channel. The wind discharging channel is provided with a wind outlet at one side thereof and a wind inlet at the other side thereof, and internally includes a first fan motor group. The wind receiving channel is provided with a wind inlet at one side thereof and a wind outlet at the other side thereof, and internally includes a second fan motor group. The second energy conversion device further includes a first air heat exchanger, a water vaporizing device and a second air heat exchanger.

The first air heat exchanger, disposed at one side of the wind receiving channel, is a heat exchanging device formed by a coil. The first air heat exchanger has a water entrance end and a water exit end. The water entrance end is connected to a first water discharging branch pipe provided with a seventh control valve. The water exit end is connected to a first water receiving branch pipe.

The water vaporizing device, installed at one side of the wind discharging channel, is a mist cooling device that generates an endothermic effect through water vaporization. A top portion of the water vaporizing device receives water sprinkled from a plurality of water holes at an end section of a water supply connecting pipe. The water supply connecting pipe is provided with a fourth water pump. The water vaporizing device is further provided with a water collecting pan below. The water collecting pan is connected to a water discharging pipe, which has the other end connected to the first water receiving branch pipe.

The second air heat exchanger, disposed at one side of the wind discharging channel, is a heat exchanging device formed by a coil. The second air heat exchanger has a water entrance end and a water exit end. The water entrance end is connected to a second water discharging pipe, which is provided with a third water pump and a sixth control valve. The water exit end is connected to a second water receiving pipe.

The water supply device is a device that collects water sources and categorizes the collected water for different usage purposes. All of the water sources enter the water supply device via at least one water feeding connecting pipe, and are delivered to the storage tank via a third water receiving pipe. The water supply device further delivers the water stored in the storage tank to the water supply device via a third water discharging pipe. The third water discharging pipe is provided with a first water pump and a second control valve. The water supply device is further connected to a water supply pipe for supplying water of different needs.

The storage tank, being an enclosed chamber, includes a plurality of water pick outlets. The plurality of water pick outlets include a first water pick outlet, a second water pick outlet, a third water pick outlet, a fourth water pick outlet, a fifth water pick outlet, and a sixth water pick outlet. The first water pick outlet is connected to the third water receiving pipe, the second water pick outlet is connected to the third water discharging pipe, the third water pick outlet is connected to the first water receiving pipe that is branch connected to the first water receiving branch pipe, the fourth water pick outlet is connected to the first water discharging pipe. The first water discharging pipe is provided with a second water pump and an eighth control valve, and is further branch connected to the first water discharging branch pipe, which is provided with a seventh control valve. The fifth water pick outlet is connected to the second water receiving pipe, and the sixth water pick outlet is connected to the second water discharging pipe.

The heat source unit, being a direct expansion heat source unit and controlled by the control unit, includes a heat source device, a first heat exchanger and a second heat exchanger.

The heat source device is a power source of refrigerant transmission, and provides a heat source.

The first heat exchanger is disposed in the wind receiving channel, and performs heat exchange of heat absorption or heat dissipation on air passing therein. A first access end of the first heat exchanger is connected to the heat source device via a third refrigerant pipe, and receives an input of the heat source. A second access end of the first heat exchanger is connected to the heat source device via a fourth refrigerant pipe.

The second heat exchanger is disposed in the wind discharging channel, and performs heat exchange of heat dissipation or heat absorption on air passing therein. A third access end of the second heat exchanger is connected to the heat source device via a first refrigerant pipe, and receives an input of the heat source. A fourth access end of the second heat exchanger is connected to the heat source device via a second refrigerant pipe.

A water energy conversion system is further provided according to another embodiment of the present invention. The water energy conversion system at least includes a control unit, a first gas-water conversion device, a second gas-water conversion device, a water supply device, at least one storage tank, and a heat source unit.

The control unit controls operations of the entire system, and is connected to a power supply system.

The first gas-water energy conversion device includes a housing, and a cooling fan, a main tube bank, at least one air pre-cooling water tube bank, a water vaporizer, and a water collecting chamber provided in the housing.

The housing, being a hollow cylindrical body, includes an accommodating space therein, an air outlet at a top portion thereof, at least one air inlet at a periphery thereof, and a filter near the air inlet.

The cooling fan is disposed at the air outlet of the housing, and is controlled by the control unit.

The main tube bank is disposed below the cooling fan, and is formed by at least one coil. The coil has a water entrance end connected to a first water discharging pipe, and a water exit end connected to a first water receiving pipe.

The air pre-cooling water tube bank is disposed at one side below the main tube bank, and is formed by at least one coil. The coil has a water entrance end connected to a main connecting pipe, and a water exit end connected to a water sprinkling pipe. The water sprinkling pipe is provided with at least one water sprinkling hole.

The water vaporizer, installed right below the main tube bank, is a mist cooling device that generates an endothermic effect through water vaporization. The water vaporizer has at least one side located at a water sprinkling region of the water sprinkling pipe, and is provided with a water collecting pan below. The water collecting pan is connected to a water collecting connecting pipe.

The water collecting chamber, disposed below the water vaporizer, is an enclosed chamber and is in communication with the water collecting pan via the water collecting connecting pipe. The water collecting chamber is connected to the main connecting pipe via a water delivering connecting pipe provided with a fifth water pump. The water collecting chamber is provided with a water level sensor and is externally connected to a water fill pipe provided with a third control valve. The water level sensor, the third control valve, and the fifth water pump are connected to and controlled by the control unit.

The second energy conversion device internally includes a wind discharging channel and a wind receiving channel. The wind discharging channel is provided with a wind outlet at one side thereof and a wind inlet at the other side thereof, and internally includes a first fan motor group. The wind receiving channel is provided with a wind inlet at one side thereof and a wind outlet at the other side thereof. The wind outlet is provided with a second fan motor group. The second energy conversion device further includes a first air heat exchanger, a water vaporizing device and a second air heat exchanger.

The first air heat exchanger, disposed at one side of the wind receiving channel, is a heat exchanging device formed by a coil. The first air heat exchanger has a water entrance end and a water exit end. The water entrance end is connected to a fourth water discharging pipe, which is provided with a seventh water pump and a tenth control valve. The water exit end is connected to a fourth water receiving pipe.

The water vaporizing device, installed at one side of the wind discharging channel, is a mist cooling device that generates an endothermic effect through water vaporization. A top portion of the water vaporizing device receives water sprinkled from a plurality of water holes at an end section of a water supply connecting pipe. The water supply connecting pipe is provided with a ninth water pump. The water vaporizing device is further provided with a water collecting pan below. The water collecting pan is connected to a water discharging pipe, which has the other end connected to the fourth water receiving pipe.

The second air heat exchanger, disposed at one side of the wind discharging channel, is a heat exchanging device formed by a coil. The second air heat exchanger has a water entrance end and a water exit end. The water entrance end is connected to a fifth water discharging pipe, which is provided with an eighth water pump and an eleventh control valve. The water exit end is connected to a fifth water receiving pipe.

The water supply device is a device that collects water sources and categorizes the collected water for different usage purposes. All of the water sources enter the water supply device via at least one water feeding connecting pipe, and are delivered to the storage tank via a third water receiving pipe. The water supply device further delivers the water stored in the storage tank to the water supply device via a third water discharging pipe, which is provided with a first water pump and a second control valve. The water supply device is further connected to at least one water supply pipe for supplying water of different needs.

The storage tank, being an enclosed chamber, includes a plurality of water pick outlets. The plurality of water pick outlets includes a first water pick outlet, a second water pick outlet, a third water pick outlet, a fourth water pick outlet, a fifth water pick outlet, a sixth water pick outlet, a seventh water pick outlet, an eighth water pick outlet, a ninth water pick outlet and a tenth water pick outlet. The first water pick outlet is connected to the third water receiving pipe, the second water pick outlet is connected to the third water discharging pipe, the third water pick outlet is connected to the first water receiving pipe, the fourth water pick outlet is connected to the first water discharging pipe provided with a second water pump and an eighth control valve, the fifth water pick outlet is connected to a fifth refrigerant pipe, the sixth water pick outlet is connected to a sixth refrigerant pipe provided with a sixth water pump and a ninth control valve, the seventh water pick outlet is connected to the fourth water receiving pipe, the eighth water pick outlet is connected to the fourth water discharging pipe provided with a seventh water pump and a tenth control valve, the ninth water pick outlet is connected to the fifth water receiving pipe, and the tenth water pick outlet is connected to the fifth water discharging pipe provided with an eighth water pump and an eleventh control valve.

The heat source unit, being a central heat source unit and controlled by the control unit, is connected to the storage tank via the sixth refrigerant pipe, and receives an input of the water stored to provide a heat source for heat exchange. The stored water having undergone heat exchange returns to the storage tank via the fifth refrigerant to generate (produce) a cold/heat source for the use of a building.

The above and other aspects of the invention will become better understood with regard to the following detailed description of the preferred but non-limiting embodiments. The following description is made with reference to the accompanying drawings.

DETAILED DESCRIPTION OF THE PREFERRED EMBODIMENTS

Figure 1:
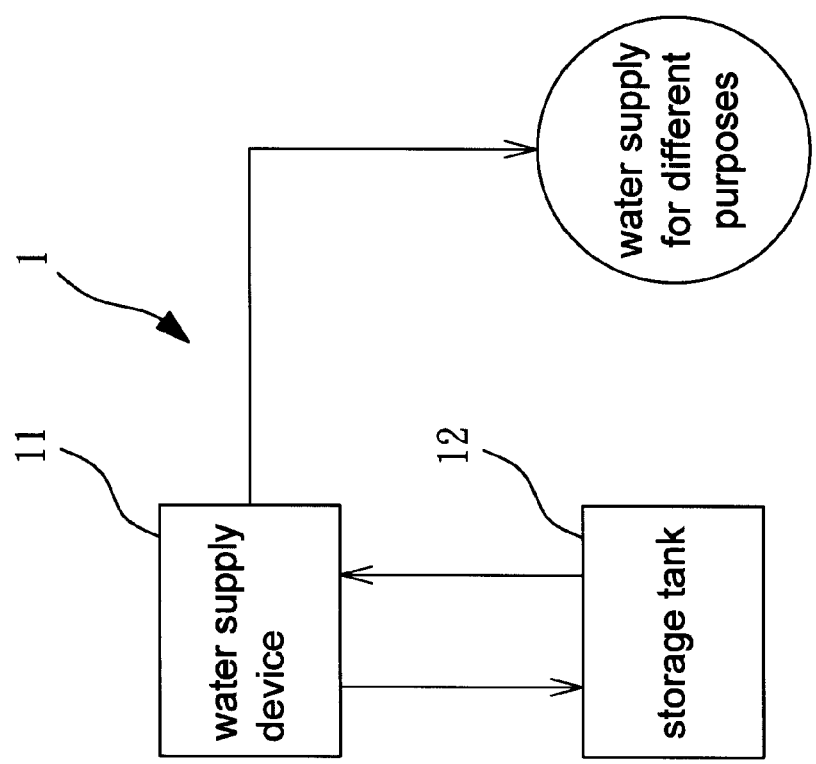
FIG. 1 is a schematic diagram of a conventional water storage method.
Figure 2:
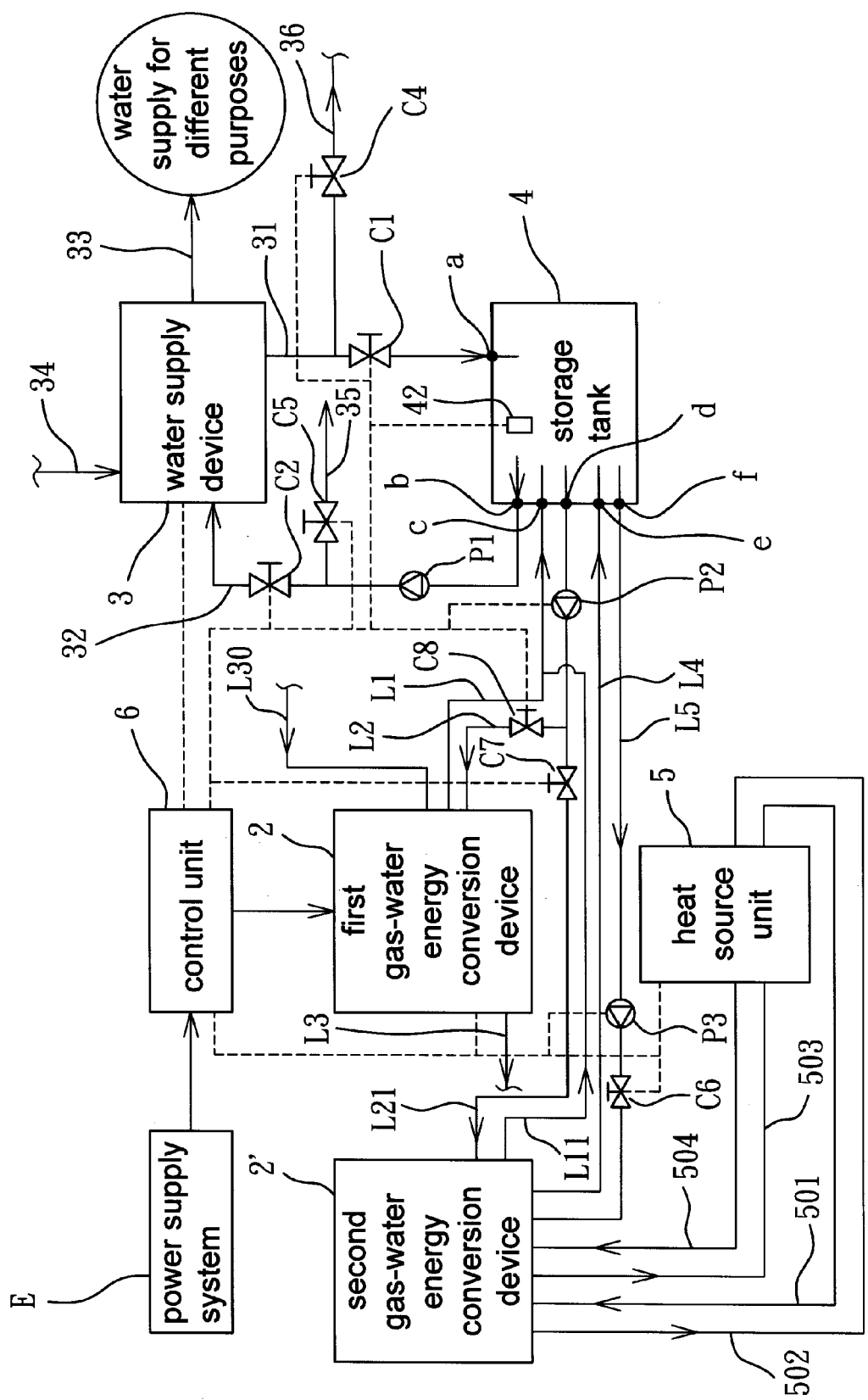
FIG. 2 is a schematic diagram of components of the present invention.
Figure 3:
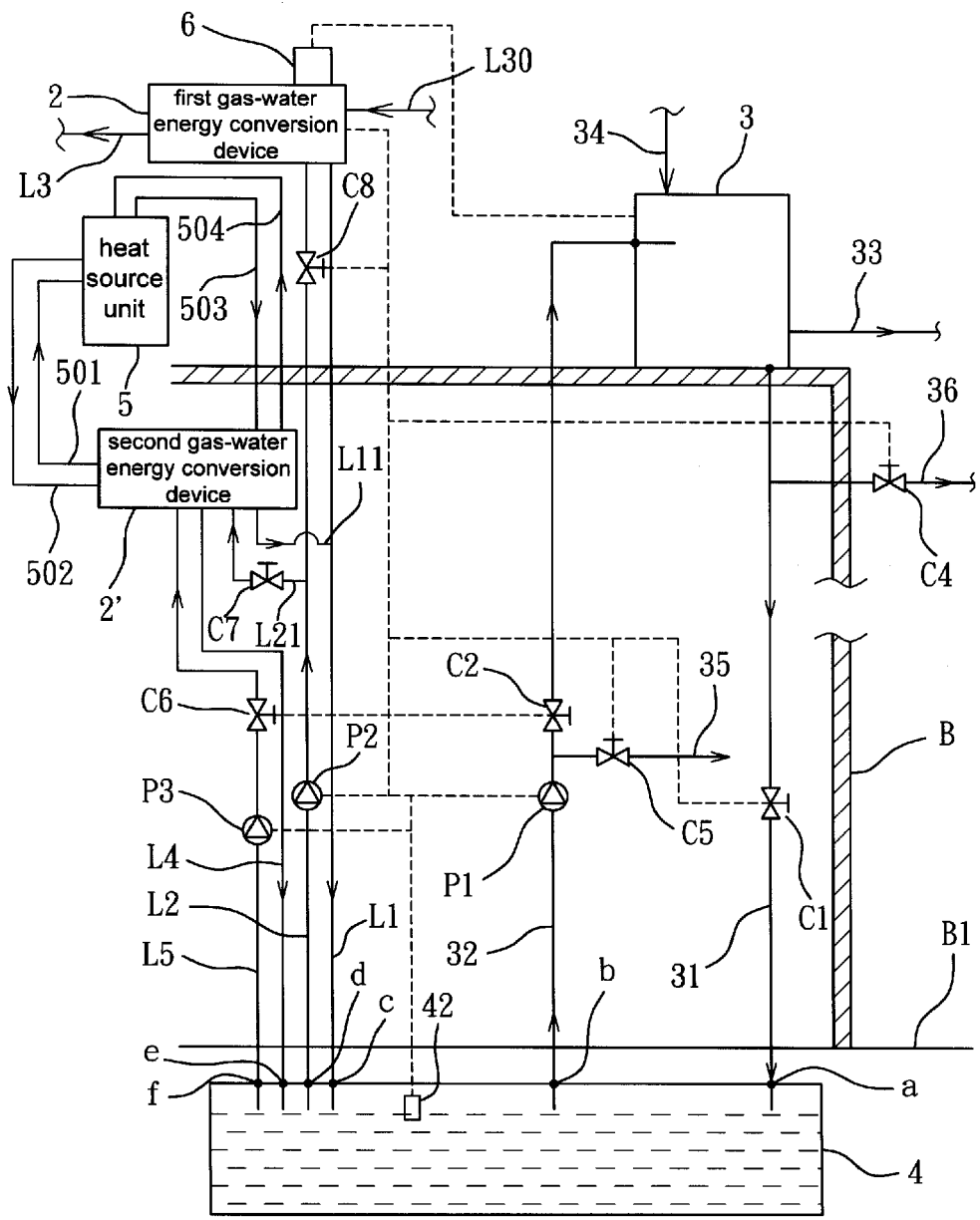
FIG. 3 is a schematic diagram according to an embodiment of the present invention.

FIGS. 2, 3, 4 and 5 show a water energy conversion system according to an embodiment of the present invention. The water energy conversion system is particularly suitable for high-temperature (above 28° C.) and low-temperature (below 15° C.) climates. By utilizing a powerful energy storage property of water, both a heat source and a cold source can be simultaneously provided to an indoor space. The water energy conversion system according to an embodiment at least includes a control unit 6, a first gas-water energy conversion device 2, a second gas-water conversion device 2', a water supply device 3, at least one storage tank 4, and a heat source unit 5.

The control unit 6 controls operations of the entire system, and is connected to a power supply system (including a city electricity supply or other green power supplies) E.

Figure 4:
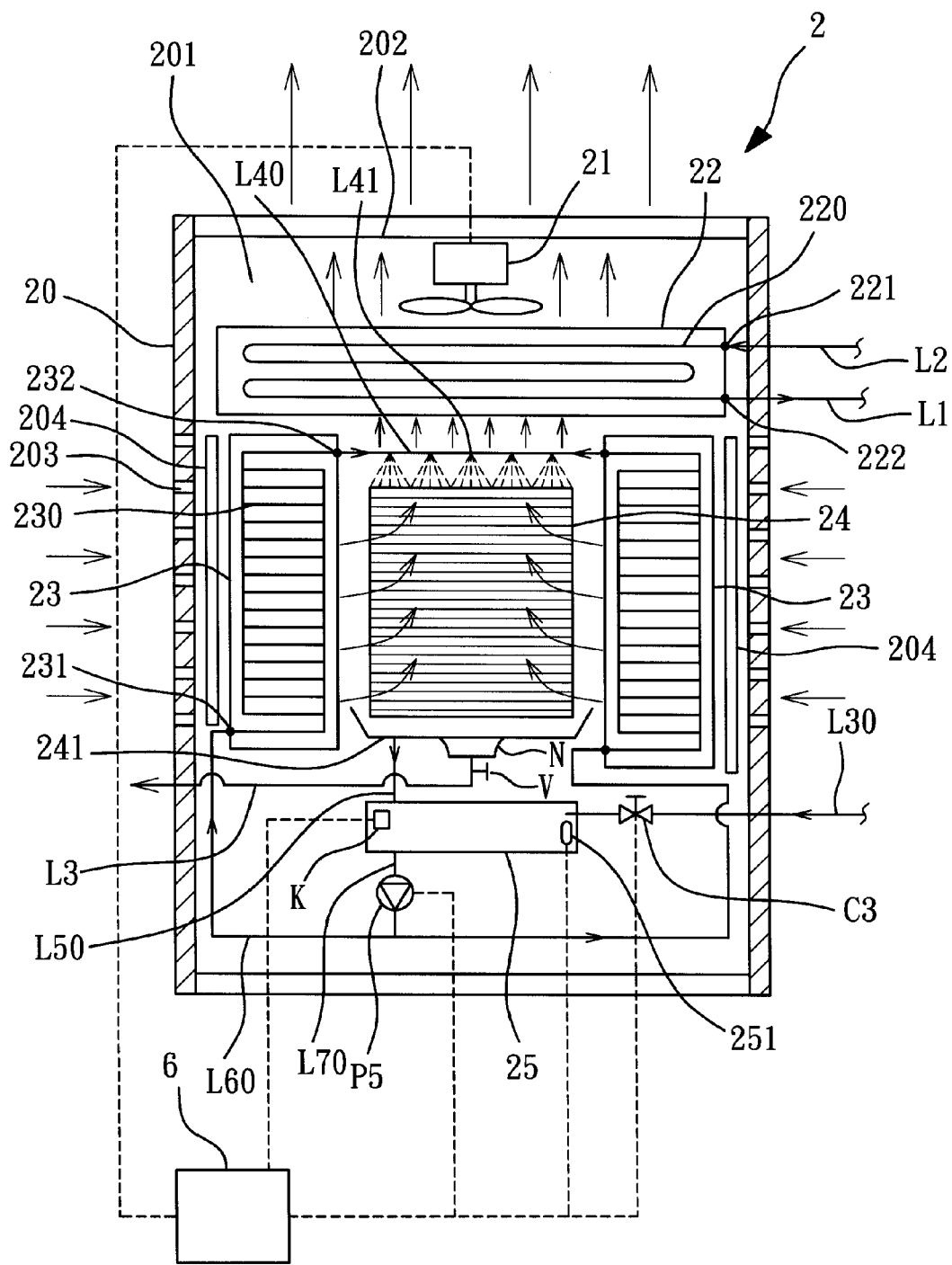
FIG. 4 is a schematic diagram of a first gas-water energy conversion device of the present invention.

Referring to FIG. 4, the first gas-water conversion device 2 includes a housing 20, and a cooling fan 21, a main tube bank 22, at least one air pre-cooling water tube bank 23, a water vaporizer 24 and a water collecting chamber 25 provided in the housing 20.

The housing 20, being a hollow cylindrical body, includes an accommodating space 201 therein, an air outlet 202 at a top portion thereof, at least one air inlet 203 at a periphery thereof, and a filter 204 adjacent to the air inlet 203.

The cooling fan 21 is provided at the air outlet 202 of the housing 20, and is controlled by the control unit 6.

The main tube bank 22 is disposed below the cooling fan 21, and is formed by at least one coil 220. The coil 220 has a water entrance end 221 connected to a first water discharging pipe L2, and a water exit end 222 connected to a first water receiving pipe L1.

The air pre-cooling water tube bank 23 is disposed at one side below the main tube bank 22, and is formed by at least one coil 230. The coil 230 has a water entrance end 231 connected to a main connecting pipe L60, and a water exit end 232 connected to a water sprinkling pipe L40. The water sprinkling pipe L40 is provided with at least one water sprinkling hole L41.

The water vaporizer 24, installed right below the main tube bank 22, is a mist cooling device that generates an endothermic effect through water vaporization. The water vaporizer 24 has at least one side located at a water sprinkling region of the water sprinkling pipe L40, and is provided with a water collecting pan 241 below. The water collecting pan 241 is connected to a water collecting connecting pipe L50.

The water collecting chamber 25, disposed below the water vaporizer 24, is an enclosed chamber and is in communication with the water collecting pan 241 via the water collecting connecting pipe L50. The water collecting chamber 25 is further connected to the main connecting pipe L60 via a water delivering connecting pipe L70 provided with a fifth water pump P5, includes a water level sensor 251, and is externally connected to a water fill pipe L30 provided with a third control valve C3. The water level sensor 251, the third control valve C3 and the fifth water pump P5 are connected to and controlled by the control unit 6.

Figure 5:
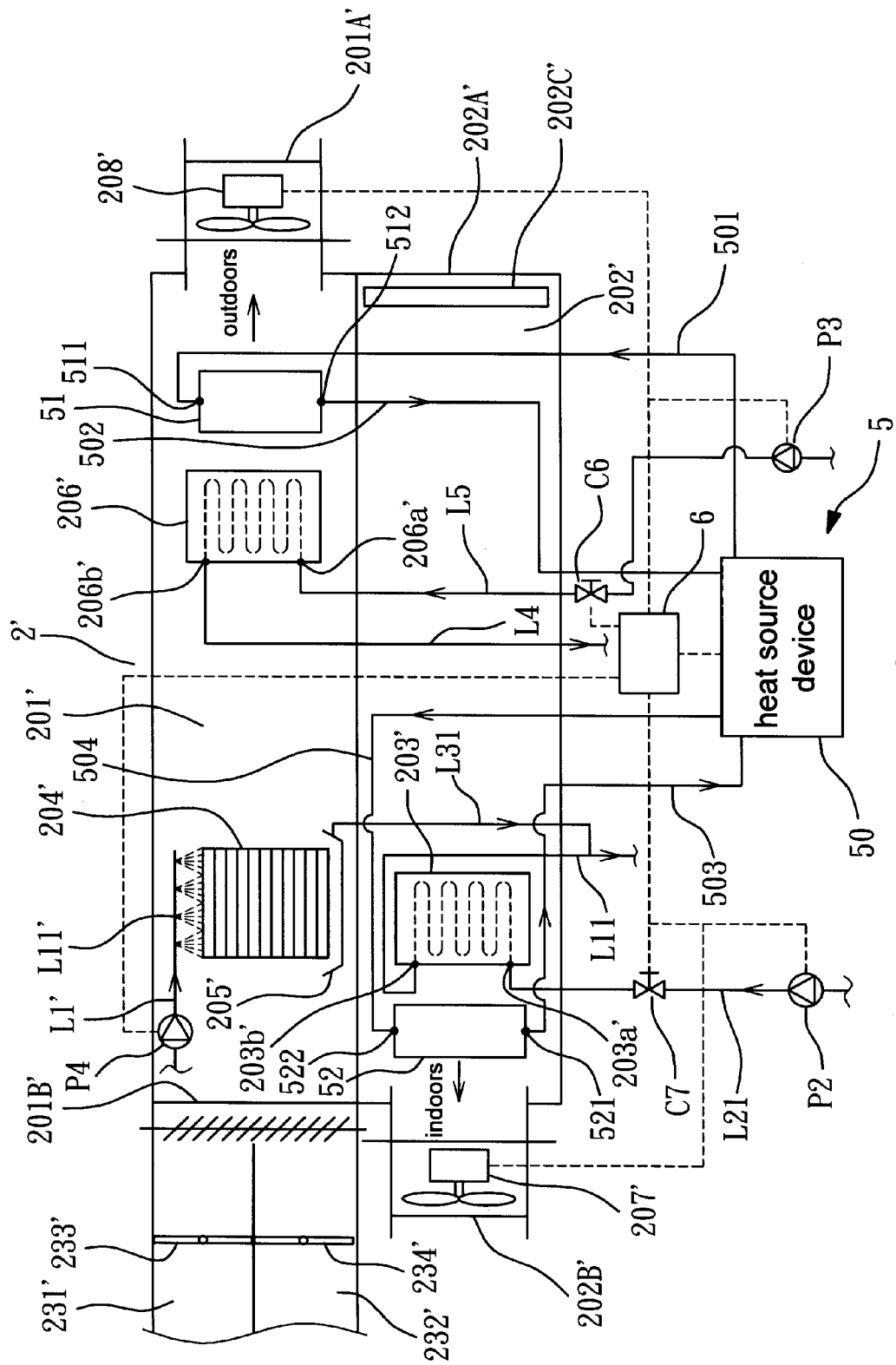
FIG. 5 is a schematic diagram of a second gas-water energy conversion device of the present invention.

Referring to FIG. 5, the second energy conversion device 2' internally includes a wind discharging channel 201' and a wind receiving channel 202'. The wind discharging channel 201' is provided with a wind outlet 201A' at one side thereof, and internally includes a first fan motor group 208' (preferably near the wind outlet 201A'). The wind discharging channel 201' is further provided with a wind inlet 201B' at the other side thereof. The wind inlet 201B' is extended and connected to an outdoor wind channel 231' and an indoor wind channel 232'. The outdoor wind channel 231' is provided with a first wind shielding plate 233', and the indoor wind channel 232' is provided with a second wind shielding plate 234'. The first wind shielding plate 233' and the second wind shielding plate 234' are controlled by the control unit 6. The wind receiving channel 202' is provided with a wind inlet 202A' and a filter 202C' at one side thereof, and a wind outlet 202B' at the other side thereof. The wind receiving channel 202' further includes a second fan motor group 207' (preferably near the wind outlet 202B'). The second energy conversion device 2' further includes a first air heat exchanger 203', a water vaporizing device 204' and a second air heat exchanger 206'.

The first air heat exchanger 203', disposed at one side of the wind receiving channel 202', is a heat exchanging device formed by a coil. The first air heat exchanger 203' has a water entrance end 203a' and a water exit end 203b'. The water entrance end 203a' is connected to a first water discharging branch pipe L21. The first water discharging branch pipe L21 is connected to the first water discharging pipe L2, and is provided with a seventh control valve C7. The water exit end 203b' is connected to a first water receiving branch pipe L11, which is connected to the first water receiving pipe L1.

The water vaporizing device 204', installed at one side of the wind discharging channel 201', is a mist cooling device that generates an endothermic effect through water vaporization. A top portion of the water vaporizing device 204' receives water sprinkled from a plurality of water holes L11' at an end section of a water supply connecting pipe L1'. The water supply connecting pipe L1' is provided with a fourth water pump P4. The water vaporizing device 204' is further provided with a water collecting pan 205' below. The water collecting pan 205' is connected to a water discharging pipe L31, which has the other end connected to the first water receiving branch pipe L11.

The second air heat exchanger 206', disposed at one side of the wind discharging channel 201', is a heat exchanging device formed by a coil. The second air heat exchanger 206' has a water entrance end 206a' and a water exit end 206b'. The water entrance end 206a' is connected to a second water discharging pipe L5, which is provided with a third water pump P3 and a sixth control valve C6. The water exit end 206b' is connected to a second water receiving pipe L4.

The water supply device 3 is a device that collects water sources (including tap water, rain water, recycled water and air conditioning condensate) and categorizes the collected water for different usage purposes. All of the water sources (having been treated) enter the water supply device 3 via at least one water feeding connecting pipe 34, and are delivered to the storage tank 4 via a third water receiving pipe 31. The third water receiving pipe 31 is provided with a first control valve C1 and is connected to a release pipe 36. The release pipe 36 is provided with a fourth control valve C4, which is constantly closed under normal conditions. When rain water recycled during a rain season exceeds a predetermined amount, the water in the water supply device 3 needs to be released. At this point, the control unit 6 controls the fourth control valve C4 to open and the first control valve C1 to close. The water supply device 3 further delivers the water stored in the storage tank 4 to the water supply device 3 via a third water discharging pipe 32. The third water discharging pipe 32 is provided with a first water pump P1 and a second control valve C2. The water supply device 3 is further connected to at least one water supply pipe 33 for supplying water serving for different purposes. The third water discharging pipe 32 is further provided connected to an unload pipe 35. The unload pipe 35 is provided with a fifth control valve C5, which is constantly closed under normal conditions. Before the arrival of a rain season or a typhoon, the fifth control valve C5 may be opened to release the water in the storage tank 4 in advance, so as to offer a greater water storage capacity for heavy rains and to achieve an anti-flooding effect.

The storage tank 4 is an enclosed chamber, and is disposed under or on a ground B1, preferably at a lower level of a building B such as a basement or as an underground reservoir of a public facility. The storage tank 4 includes a plurality of water pick outlets a, b, c, d, e and f, and a water level detector 42. The plurality of water pick outlets include a first water pick outlet a, a second water pick outlet b, a third water pick outlet c, a fourth water pick outlet d, a fifth water pick outlet e, and a sixth water pick outlet f. The first water pick outlet a is connected to the third water receiving pipe 31, the second water pick outlet b is connected to the third water discharging pipe 32, the third water pick outlet c is connected to the first water receiving pipe L1 that is branch connected to the first water receiving branch pipe L11, and the fourth water pick outlet d is connected to the first water discharging pipe L2. The first water discharging pipe L2 is provided with a second water pump P2 and an eighth control valve C8, and is further branch connected to the first water discharging branch pipe L21, which is provided with a seventh control valve C7. The fifth water pick outlet e is connected to the second water receiving pipe L4, and the sixth water pick outlet f is connected to the second water discharging pipe L5. The water level detector 42 detects a water level of water stored in the storage tank 4.

The heat source unit 5, being a direct expansion heat source unit and controlled by the control unit 6, includes a heat source device 50, a first heat exchanger 52 and a second heat exchanger 51.

The heat source device 50 is a power source of refrigerant transmission, and provides a heat source (including cold energy and heat energy, with the cold energy providing cooling effects and the heat energy providing heating effects).

The first heat exchanger 52 is disposed in the wind receiving channel 202', and performs heat exchange of heat absorption or heat dissipation on air passing therein. More specifically, during cold air circulation, the first heat exchanger 52 serves as a refrigerant heat-absorbing vaporizing coil to perform heat exchange of heat absorption; during hot air circulation, the first heat exchanger 52 serves as a refrigerant heat-dissipating condensing coil to perform heat exchange of heat dissipation. A first access end 521 of the first heat exchanger 52 is connected to the heat source device 50 via a third refrigerant pipe 503, and receives an input of the heat source (the heat source is cold energy during cold air circulation and heat energy during hot air circulation). A second access end 522 of the first heat exchanger 52 is connected to the heat source device 50 via a fourth refrigerant pipe 504.

The second heat exchanger 51 is disposed in the wind discharging channel 201', and performs heat exchange of heat dissipation or heat absorption on air passing therein. More specifically, during cold air circulation, the second heat exchanger 51 serves as a refrigerant heat-dissipating condensing coil to dissipate waste heat of the heat source unit; during hot air circulation, the second heat exchanger 51 serves as a refrigerant heat-absorbing coil. A third access end 511 of the second heat exchanger 51 is connected to the heat source device 50 via a first refrigerant pipe 501, and receives an input of the heat source. The heat source serves for heat energy dissipation during cold air circulation, and serves for cold energy heat absorption during hot air circulation. A fourth access end 512 of the second heat exchanger 51 is connected to the heat source device 50 via a second refrigerant pipe 502.

During operations of the cooling fan 21 of the first gas-water energy conversion device 2, external air enters from the air inlet 203, and passes through the air pre-cooling water tube bank 23 for pre-cooling. That is, the water temperature in the air pre-cooling water tube bank 23 is lower than the temperature of the incoming air, and so the temperature of the incoming air is lowered for a pre-cooling effect due to heat exchange effects as the air passes through. The incoming air then reaches the water vaporizer 24. A mist is formed from the water sprinkled from the water sprinkling holes L41 of the water sprinkling pipe L40, and performs heat exchange with the incoming air to produce a water vaporization effect, thereby rapidly lowering the temperature of the incoming air. Meanwhile, as circulating water flows in the coil 220 of the main tube bank 22, heat exchange is again performed, such that the temperature of the incoming air is further lowered to provide the incoming air with even a lower temperature for indoor air conditioning. After performing heat exchange with the incoming air, the circulating water passing through the coil 220 of the main tube bank 22 enters the storage tank 4 via the first water receiving pipe L1, and performs heat exchange with the water stored in the storage tank to further produce a cooling effect. The circulating water (i.e., the stored water) in the storage tank 4 also flows into the main tube bank 22 via the first water discharging pipe L2 to again perform heat exchange with the incoming air passing through the water vaporizer 24.

The water collecting pan 241 below the water vaporizer 24 collects the water that the water sprinkling pipe L40 sprinkles on the water vaporizer 24 (the temperature of the water at this point is lowered due to the water vaporization effect). The water collected enters the water collecting chamber 25 via the water collecting connecting pipe L50, and is delivered to the air pre-cooling water tube bank 23 by the fifth water pump 23 at the water delivering connecting pipe L70. After pre-cooling the external air passing through the air pre-cooling water tube bank 23, the delivered water is sprinkled on the water vaporizer 24 via the water sprinkling holes L41 of the water sprinkling pipe L40, and then enters the water collecting chamber 25 via the water collecting pan 241. The water sensor 251 in the water collecting chamber 25 constantly detects the water level in the water collecting chamber 25. Once the water level is lower than a predetermined level, the control unit 6 controls the third control valve C3 to open, so as to fill water by the water fill pipe L30. When the water level sensor 251 detects that the internal water level again reaches the predetermined level, the control unit 6 controls the third control valve C3 to close to stop filling water.

In the first gas-water energy conversion device 2 of the present invention, the control unit 6 controls the fifth water pump P5 to deactivate when the temperature of the circulating water in the main tube bank 22 reaches a predetermined low temperature. The predetermined low temperature may be set based on requirements, and is generally below 25° C. When the fifth water pump P5 is deactivated, operations of water vaporization for cooling reinforcement are halted to achieve water saving and energy saving effects. In contrast, the control unit 6 controls the fifth pump P5 to accelerate an operation speed when the circulating water in the main tube bank 22 reaches a predetermined high temperature. The predetermined high temperature may be set based on requirements, and is generally above 30° C. With the operating speed of the fifth water pump P5 is accelerated, the water vaporization and circulation capabilities are reinforced to increase the cooling efficiency.

Figure 6:
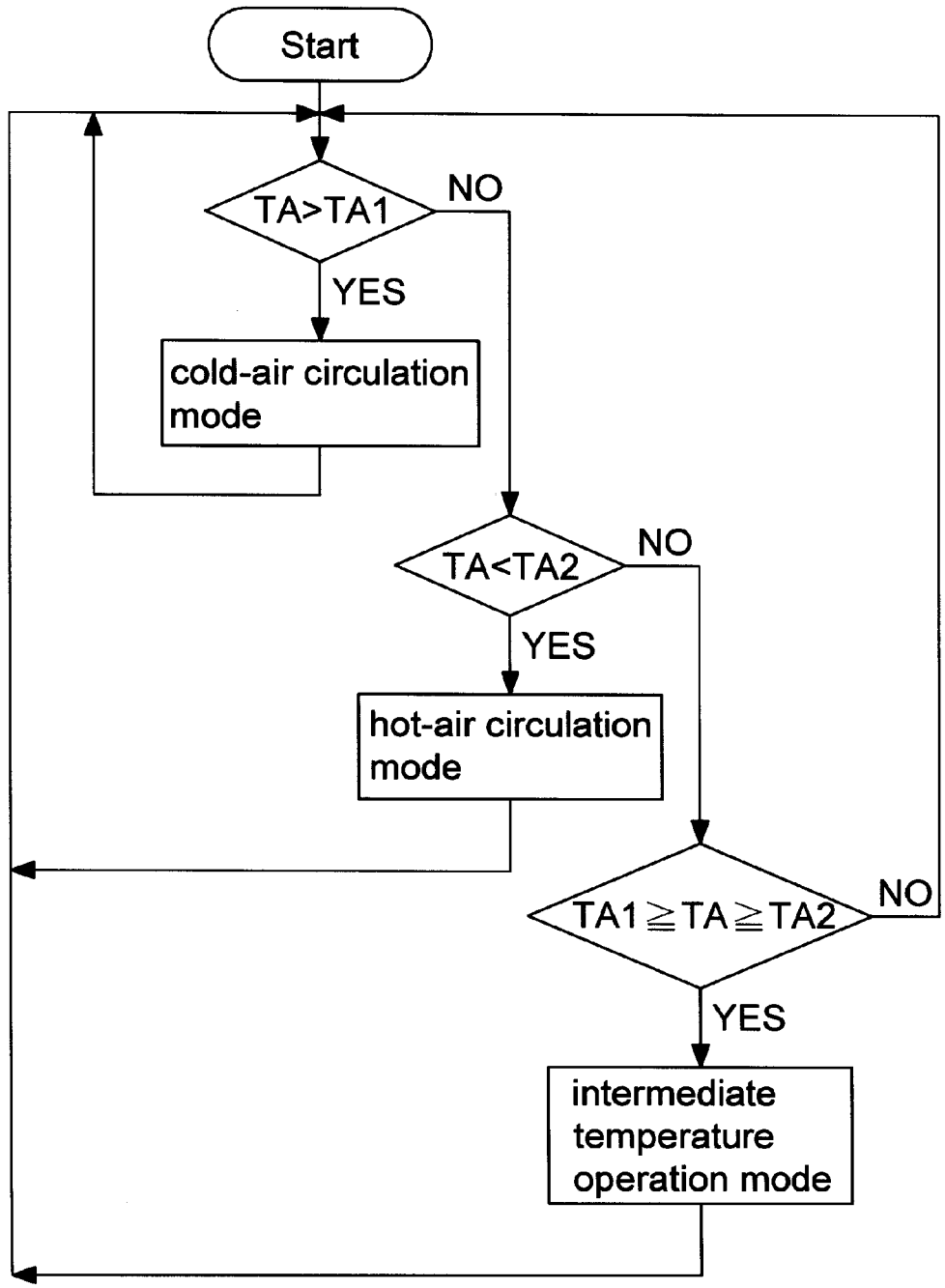
FIG. 6 is flowchart of operations of the present invention.

With the above structures and architecture, in addition to the ability of adaptively regulating a building, the present invention also features both proactive cooling and heating effects. That is, energy conversion is achieved by the first gas-water energy conversion device 2 and the second gas-water energy conversion device 2' collaborating with the storage tank 4. Operations of the heat source unit 5 are further combined. The heat source unit 5 is operated on the priority of achieving an internal energy balance of the building B, and is only proactively activated in the shortage of supply of energy conversion, such that operating power of the heat source unit 5 can be significantly saved. According to environmental requirements of the building B, energy needed for the air conditioning can be adjusted through different operation modes, including a cold-air circulation operation mode, a hot-air circulation operation mode, and an intermediate temperature operation mode to be described below (referring to FIG. 6).

Details of the cold-air circulation operation mode are given below. When an indoor temperature TA is greater than a cold-air supply value TA1, cold-air circulation is performed to provide cold air. At this point, indoor air is discharged via the wind discharging channel 201', and passes the water vaporizing device 204' to perform heat exchange. That is, the water vaporizing device 204' produces a pre-cooling effect on the air by energy conversion, such that sensible heat in the air discharged from indoors is transferred, thereby lowering the temperature through the heat absorbing effect provided by the water vaporization. Thus, the circulating water is also cool, and then returns to the storage tank 4 to lower the temperature of the stored water. The circulating water is further delivered to the first air heat exchanger 203' via the second water pump P2 to provide a cooling effect and energy required for conversion when the incoming air passes through the first air heat exchanger 203', thereby reducing a heat exchange load of the first heat exchanger 52. Further, the air discharged from the air discharging channel 201' passes through the water vaporizing device 204' and the second air heat exchanger 206', and reaches the second heat exchanger 51 where the discharged air again performs heat conversion. As such, the second heat exchanger 51 removes the heat converted by the first heat exchanger 52, in a way that the temperature of the air discharged to outdoors becomes far lower than the temperature of air that is directly discharged by a conventional air conditioner, thus lowering thermal pollution that discharged waste heat poses on the environment. In addition, the thermal load of the heat source unit 5 is also reduced, and so the power consumption of the heat source unit 5 is greatly decreased and the operation efficiency of the heat source unit 5 is enhanced. Therefore, while providing indoors with low-temperature and fresh air, the object of power saving is achieved. During cold-air circulation, the heat source (i.e., heat energy) of the heat source unit 5 is first outputted from the heat source device 50 and transmitted to the second heat exchanger 51 via the first refrigerant pipe 501, undergoes heat exchange of condensation and heat dissipation with the discharged air via the second heat exchanger 51, and returns to the heat source device 50 via the second refrigerant pipe 502. On the other hand, the heat source (i.e., cold energy) of the heat source unit 5 is first outputted from the heat source device 50 and transmitted to the first heat exchanger 52 via the fourth refrigerant pipe 504, undergoes heat exchange of vaporization and heat absorption with the incoming air via the first heat exchanger 52 to adjust the temperature of the incoming air according to indoor requirements and thus to provide cold air required by indoors, and returns to the heat source device 50 via the third refrigerant pipe 503 to complete a cold-air circulation process.

Details of the hot-air circulation operation mode are given below. When the indoor temperature TA is lower than a hot-air supply value TA2, the hot-air circulation is initiated to provide hot air. At this point, indoor air is discharged from the air discharging channel 201. As the temperature of the air discharged from indoors is higher, the water supply connecting pipe L1' stops supplying water and the water vaporizing device 204' stops operating, in a way that sensible heat in the air is transferred to increase the temperature. Meanwhile, the temperature of the circulating water in the second air heat exchanger 206' also rises, and the circulating water returns to the storage tank 4 to increase the temperature of the stored water. The water is delivered to the first air heat exchange 203' via the second water pump P2, so as to provide energy needed for preheating conversion when the incoming air passes through the first air heat exchanger 203', thereby reducing the heat exchange load of the first heat exchanger 52. During hot-air circulation, the heat source (cold energy) of the heat source unit 5 is first outputted from the heat source device 50 and transmitted to the second heat exchanger 51 via the first refrigerant pipe 501, undergoes heat exchange of vaporization and heat absorption with the discharged air via the second heat exchanger 51, and returns to the heat source device 50 via the second refrigerant pipe 502. On the other hand, the heat source (heat energy) of the heat source unit 50 is first outputted from the heat source device 50 and transmitted to the first heat exchanger 52 via the fourth refrigerant pipe 504, undergoes heat exchange of condensation and heat dissipation with the incoming air via the first heat exchanger 52 to adjust the temperature of the incoming air according to indoor requirements and thus to provide hot air required by indoors, and returns to the heat source device 50 via the third refrigerant pipe 503 to complete a hot-air circulation process.

Details of the intermediate temperature operation mode are given below. When the indoor temperature TA is within an intermediate temperature range (i.e., a most comfortable indoor temperature range of 23° C. to 26° C. in summer, and 18° C. to 20° C. in winter, and an outdoor temperature range of 15° C. to 18° C.) between the hot-air supply value TA2 and the cold-air supply value TA1, the air conditioner need not be activated for cooling or heating. Instead, only the first gas-water energy conversion device 2' is operated to perform energy conversion between external air and indoors and to supply fresh air and to obtain a pleasant indoor ambient temperature. There are two scenarios of energy utilization and conversion. In the first scenario, with the operations of the second gas-water energy conversion device 2', the water having a high temperature (above 28° C.) stored during daytime (or summer) in the storage tank 4 is delivered to the first air heat exchanger 203' (to provide a pre-cooling effect (in summer) when the external air enters the wind receiving channel 202', and to provide a pre-heating effect in winter) via the second water pump P2 at the first water discharging branch pipe L21, enters via the water entrance end 203a', exits the water exit end 203b', and returns to the storage tank 4 via the first water receiving branch pipe L11. Further, the storage tank 4 supplies the water going out through the water holes L11' of the water supply connecting pipe L1' via the fourth water pump P4, and the outgoing water is sprinkled on the water vaporizing device 204' to produce water vaporization and heat absorption effects. The outgoing water is then cooled and collected at the water collecting pan 205' (at this point, the temperature of the discharged air in the wind discharging channel 201' is reduced due to water vaporization and heat absorption), and returns to the storage tank 4 via the water discharging pipe L31 and the first water receiving branch pipe L11. After the water with a lower temperature returns to the storage tank 4, the water stored in the storage tank 4 is cooled due to heat exchange. Further, when the discharged air passes through the second air heat exchanger 206', the third water pump P3 at the second water discharging pipe L5 sends the water stored in the storage tank 4 to the second air heat exchanger 206' for heat exchange with the discharged air, and the water having undergone heat exchange returns to the storage tank 4 via the second water receiving pipe L4. As a result of heat exchange, the temperature of the water is lowered (in summer, whereas the water is pre-heated and the temperature of the water rises in winter), such that the temperature of the water stored in the storage tank 4 also drops as a result of heat exchange. Further, when the temperature drops during nighttime, with the energy conversion of the second energy conversion device 2', the temperature (approximately at 20° C.) of the water returning to the storage tank 4 is also lower than that during daytime. By employing such energy storage means, the water having a lower temperature stored during the nighttime may be utilized for energy conversion for a high-temperature environment (above 28° C.) during the daytime. Thus, the high-temperature external air may be converted to a comfortable incoming air to refill fresh air for satisfying requirements in the building B, thereby obtaining a pleasant indoor ambient temperature. In the second scenario, in a low-temperature (below 15° C.) environment during the nighttime (or in winter), the water stored in the storage tank 4 is heated by the second air heat exchanger 206' during the day and then stored for the use of a low-temperature environment in the nighttime. When the discharged air passes through the second heat exchanger 206', the third water pump P3 at the second water discharging pipe L5 delivers the water stored in the storage tank 4 to the second air heat exchanger 206' for heat exchange with the discharged air, and the water then returns to the storage tank 4 via the second water receiving pipe L4. At this point, the temperature of the water rises due to heat exchange, and the temperature of the water stored in the storage tank 4 also increases due to heat exchange. When the temperature rises during the daytime, with the energy conversion of the second energy conversion device 2', the temperature (approximately at 20° C.) of the water that returns to the storage tank 4 and having undergone heat exchange is also higher than that during the nighttime. By employing such energy storage means, the water having a higher temperature stored during the daytime may be utilized for energy conversion for a low-temperature environment (below 15° C.) in the nighttime. Thus, the low-temperature external air may be converted to a comfortable incoming air and to refill fresh air for satisfying requirements in the building B, thereby obtaining a pleasant indoor ambient temperature.

Figure 7:
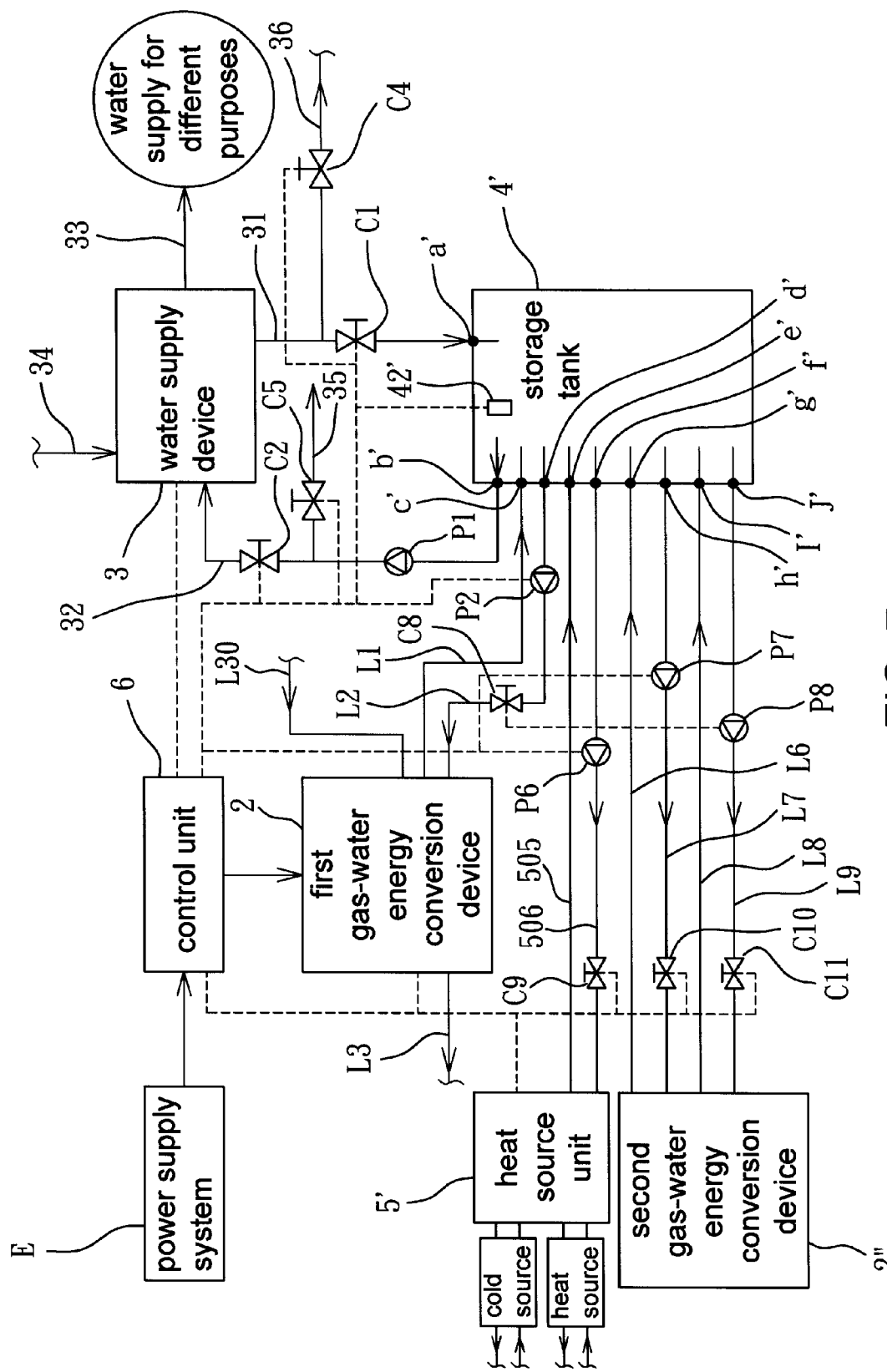
FIG. 7 is a schematic diagram according to another embodiment of the present invention.
Figure 8:
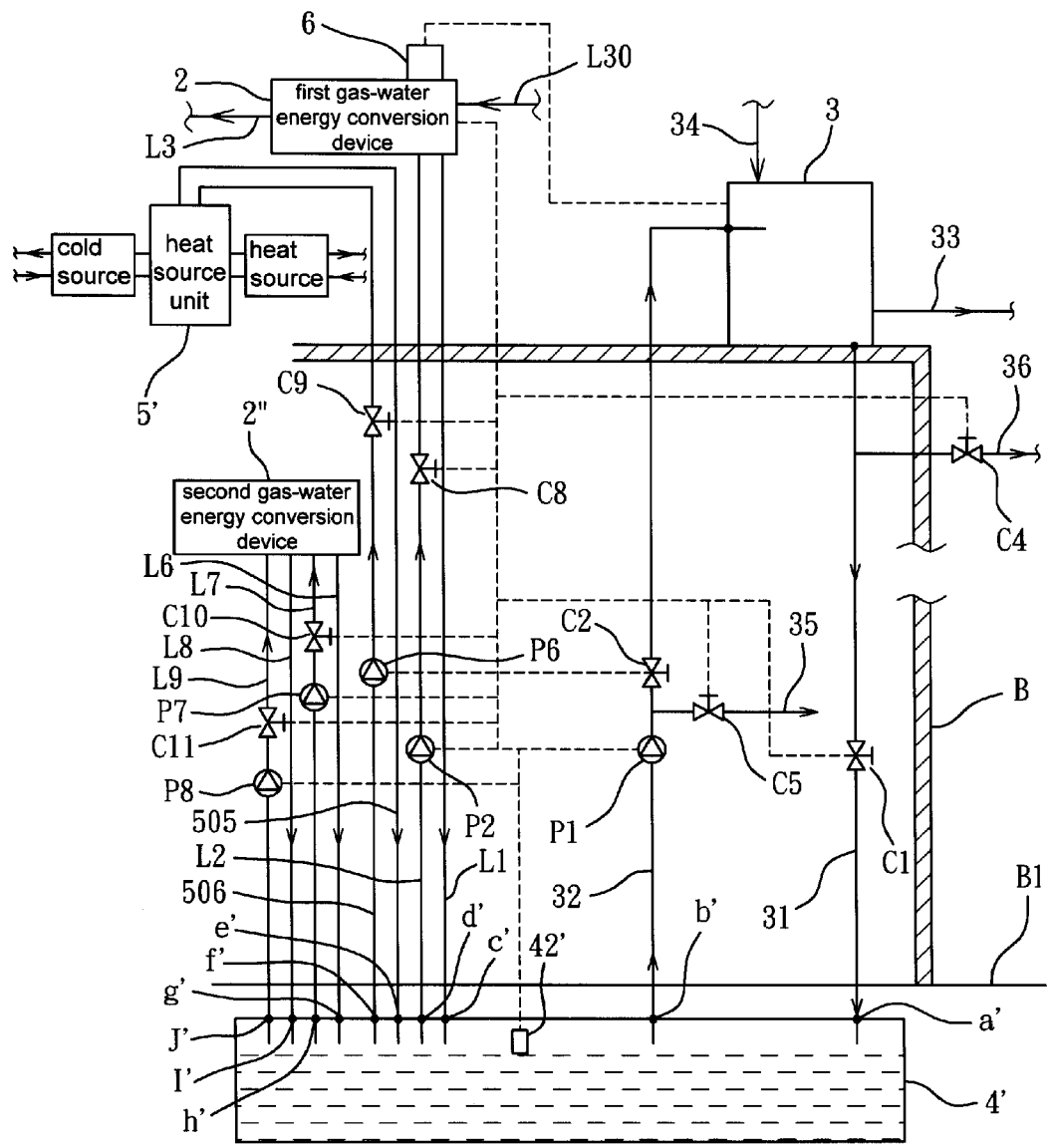
FIG. 8 is a schematic diagram according to another embodiment of the present invention.
Figure 9:
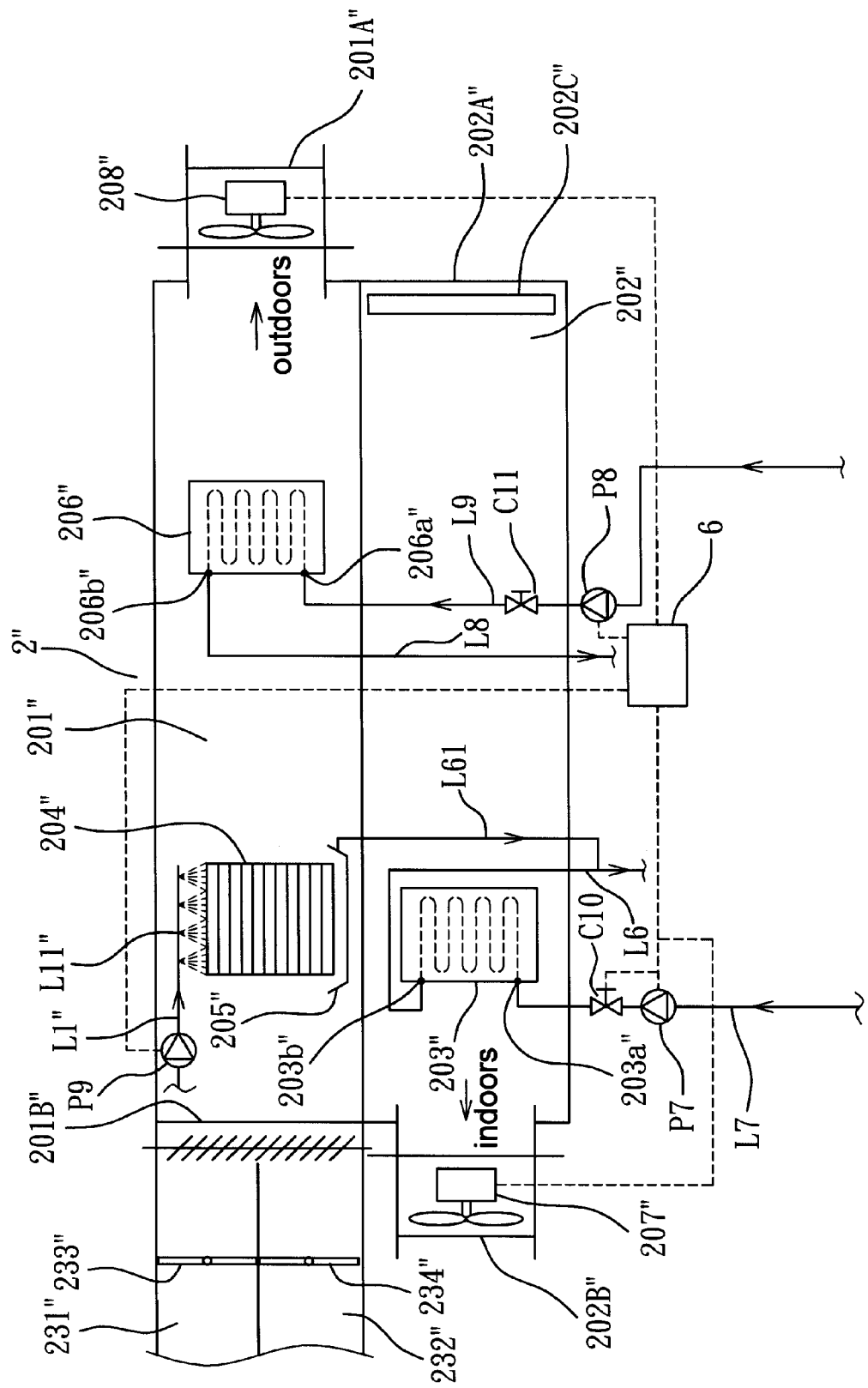
FIG. 9 is a schematic diagram of a second gas-water conversion device according to another embodiment of the present invention.

FIGS. 7, 8 and 9 show a water energy conversion system according to another embodiment of the present invention. In the embodiment, the water energy conversion system at least includes a control unit 6, a first gas-water energy conversion device 2, a second gas-water energy conversion device 2", a water supply device 3, at least one storage tank 4' and a heat source unit 5.

The control unit 6 controls operations of the entire system, and is connected to a power supply system (including a city power supply or other green power supplies) E.

Referring to FIG. 4, the first gas-water energy conversion device 2 includes a housing 20, and a cooling fan 21, a main tube bank 22, at least one air pre-cooling water tube bank 23, a water vaporizer 24 and a water collecting chamber 25 disposed in the housing 20.

The housing 20, being a hollow cylindrical body, includes an accommodating space 201 therein, an air outlet 202 at a top portion thereof, at least one air inlet 203 at a periphery thereof, and a filter 204 adjacent to the air inlet 203.

The cooling fan 21 is provided at the air outlet 202 of the housing 20, and is controlled by the control unit 6.

The main tube bank 22 is disposed below the cooling fan 21, and is formed by at least one coil 220. The coil 220 has a water entrance end 221 connected to a first water discharging pipe L2 and a water exit end 222 connected to a first water receiving pipe L1.

The air pre-cooling water tube bank 23 is disposed at one side below the main tube bank 22, and is formed by at least one coil 230. The coil 230 has a water entrance end 231 connected to a main connecting pipe L60, and a water exit end 232 connected to a water sprinkling pipe L40. The water sprinkling pipe L40 is provided with at least one water sprinkling hole L41.

The water vaporizer 24, installed right below the main tube bank 22, is a mist cooling device that generates an endothermic effect through water vaporization. The water vaporizer 24 has at least one side located at a water sprinkling region of the water sprinkling pipe L40, and is provided with a water collecting pan 241 below. The water collecting pan 241 is connected to a water collecting connecting pipe L50.

The water collecting chamber 25, disposed below the water vaporizer 24, is an enclosed chamber and is in communication with the water collecting pan 241 via the water collecting connecting pipe L50. The water collecting chamber 25 is further connected to the main connecting pipe L60 via a water delivering connecting pipe L70 provided with a fifth water pump P5, includes a water level sensor 251, and is externally connected to a water fill pipe L30 provided with a third control valve C3. The water level sensor 251, the third control valve C3, and the fifth water pump P5 are connected to and controlled by the control unit 6.

Referring to FIG. 9, the second energy conversion device 2" internally includes a wind discharging channel 201" and a wind receiving channel 202". The wind discharging channel 201" is provided with a wind outlet 201A" at one side thereof and a wind inlet 201B" at the other side thereof, and internally includes a first fan motor group 208" (preferably near the wind outlet 201A"). The wind inlet 201B" is extended and connected to an outdoor wind channel 231" and an indoor wind channel 232". The outdoor wind channel 231" is provided with a first wind shielding plate 233", and the indoor wind channel 232" is provided with a second wind shielding plate 234". The first wind shielding plate 233" and the second wind shielding plate 234" are controlled by the control unit 6. The wind receiving channel 202" is provided with a wind inlet 202A" and a filter 202C" at one side thereof, and a wind outlet 202B" at the other side thereof. The wind receiving channel 202" further includes a second fan motor group 207" (preferably near the wind outlet 202B"). The second energy conversion device 2" further includes a first air heat exchanger 203", a water vaporizing device 204" and a second air heat exchanger 206".

The first air heat exchanger 203", disposed at one side of the wind receiving channel 202", is a heat exchanging device formed by a coil. The first air heat exchanger 203" is provided with a water entrance end 203a" and a water exit end 203b". The water entrance end 203a" is connected to a fourth water discharging pipe L7, which is provided with a seventh water pump P7 and a tenth control valve C10. The water exit end 203b" is connected to a fourth water receiving pipe L6.

The water vaporizing device 204", installed at one side of the wind discharging channel 201", is a mist cooling device that generates an endothermic effect through water vaporization. A top portion of the water vaporizing device 204" receives water sprinkled from a plurality of water holes L11" at an end section of a water supply connecting pipe L1". The water supply connecting pipe L1" is provided with a ninth water pump P9. The water vaporizing device 204" is further provided with a water collecting pan 205" below. The water collecting pan 205" is connected to a water discharging pipe L61, which has the other end connected to the fourth water receiving pipe L6.

The second air heat exchanger 206", disposed at one side of the wind discharging channel 201", is a heat exchanging device formed by a coil. The second air heat exchanger 206" has a water entrance end 206a" and a water exit end 206b". The water entrance end 206a" is connected to a fifth water discharging pipe L9, which is provided with an eighth water pump P8 and an eleventh control valve C11. The water exit end 206b" is connected to a fifth water receiving pipe L8.

The water supply device 3 is a device that collects water sources (including tap water, rain water, recycled water and air conditioning condensate) and categorizes the collected water for different usage purposes. All of the water sources (having been treated) enter the water supply device 3 via at least one water feeding connecting pipe 34, and are delivered to the storage tank 4' via a third water receiving pipe 31. The third water receiving pipe 31 is provided with a first control valve C1 and is connected to a release pipe 36. The release pipe 36 is provided with a fourth control valve C4, which is constantly closed under normal conditions. When rain water recycled during a rain season exceeds a predetermined amount, the water in the water supply device 3 needs to be released. At this point, the control unit 6 controls the fourth control valve C4 to open and the first control valve C1 to close. The water supply device 3 further delivers the water stored in the storage tank 4' via a third water discharging pipe 32 to the water supply device 3. The third water discharging pipe 32 is provided with a first water pump P1 and a second control valve C2. The water supply device 3 is further connected to a water supply pipe 33 for supplying water serving for different purposes. The third water discharging pipe 32 is further connected to an unload pipe 35 provided with a fifth control valve C5, which is constantly closed under normal conditions. Before the arrival of a rain season or a typhoon, the fifth control valve C5 may be opened to release the water in the storage tank 4 in advance, so as to offer a greater water storage capacity for heavy rains and to achieve an anti-flooding effect.

The storage tank 4' is an enclosed chamber, and is disposed under or on a ground B1, preferably at a lower level of a building B such as a basement or as an underground reservoir of a public facility. The storage tank 4' includes a plurality of water pick outlets a', b', c', d', e', f', g', h', I' and J', and a water level detector 42'. The plurality of water pick outlets include a first water pick outlet a', a second water pick outlet b', a third water pick outlet c', a fourth water pick outlet d', a fifth water pick outlet e', a sixth water pick outlet f', a seventh water pick outlet g', an eighth water pick outlet h', a ninth water pick outlet I', and a tenth water pick outlet J'. The first water pick outlet a' is connected to the third water receiving pipe 31, the second water pick outlet b' is connected to the third water discharging pipe 32, the third water pick outlet c' is connected to the first water receiving pipe L1, the fourth water pick outlet d' is connected to the first water discharging pipe L2 provided with a second water pump P2 and a control valve C8, the fifth water pick outlet e' is connected to a fifth refrigerant pipe 505, the sixth water pick outlet f' is connected to a sixth refrigerant pipe 506 provided with a sixth water pump P6 and a ninth control valve C9, the seventh water pick outlet g' is connected to the fourth water receiving pipe L6, the eighth water pick outlet h' is connected to the fourth water discharging pipe L7 provided with a seventh water pump P7 and a tenth control valve C10, the ninth water pick outlet I' is connected to the fifth water receiving pipe L8, and the tenth water pick outlet J' is connected to the fifth water discharging pipe L9 provided with an eighth water pump P8 and an eleventh control valve C11. The water detector 42' detects a level of water stored in the storage tank 4'.

The heat source unit 5', being a central heat source unit and controlled by the control unit 6, is connected to the storage tank 4' via the sixth refrigerant pipe 506, and receives an input of the water stored to provide a heat source for heat exchange. The water stored is cold energy during cold air circulation and heat energy during hot-air circulation. Further, the stored water, having undergone heat exchange, returns to the storage tank 4' via the fifth refrigerant pipe 505.

During operations of the cooling fan 21 of the first gas-water energy conversion device 2, external air enters from the air inlet 203, and passes through the air pre-cooling water tube bank 23 for pre-cooling. That is, the water temperature in the air pre-cooling water tube bank 23 is lower than the temperature of the incoming air, and so the temperature of the incoming air is lowered for a pre-cooling effect due to heat exchange effects as the air passes through. The incoming air then reaches the water vaporizer 24. A mist is formed from the water sprinkled from the water sprinkling holes L41 of the water sprinkling pipe L40, and performs heat exchange with the incoming air to produce a water vaporization effect, thereby rapidly lowering the temperature of the incoming air. Meanwhile, as circulating water flows in the coil 220 of the main tube bank 22, heat exchange is again performed such that the temperature of the incoming air is further lowered to provide the incoming air with even a lower temperature for indoor air conditioning. After performing heat exchange with the incoming air, the circulating water passing through the coil 220 of the main tube bank 22 enters the storage tank 4' via the first water receiving pipe L1, and performs heat exchange with the water stored in the storage thank to further produce a cooling effect. The circulating water (i.e., the stored water) in the storage tank 4' also flows into the main tube bank 22 via the first water discharging pipe L2 to again perform heat exchange with the incoming air passing through the water vaporizer 24.

The water collecting pan 241 below the water vaporizer 24 collects the water that the water sprinkling pipe L40 sprinkles on the water vaporizer 24 (the temperature of the water at this point is lowered due to the water vaporization effect). The water collected enters the water collecting chamber 25 via the water collecting connecting pipe L50, and is delivered to the air pre-cooling water tube bank 23 by the fifth water pump P5 at the water delivering connecting pipe L70. After pre-cooling the external air passing through the air pre-cooling water tube bank 23, the delivered water is sprinkled on the water vaporizer 24 via the water sprinkling holes L41 of the water sprinkling pipe L40, and then enters the water collecting chamber 25 via the water collecting pan 241. The water sensor 251 in the water collecting chamber 25 constantly detects the water level in the water collecting chamber 25. Once the water level is lower than a predetermined level, the control unit 6 controls the third control valve C3 to open, so as to fill water by the water fill pipe L30. When the water level sensor 251 detects that the internal water level again reaches the predetermined level, the control unit 6 controls the third control valve C3 to close to stop filling water.

In the first gas-water energy conversion device 2 of the present invention, the control unit 6 controls the fifth water pump P5 to deactivate when the temperature of the circulating water in the main tube bank 22 reaches a predetermined low temperature. The predetermined low temperature may be set based on requirements, and is generally below 25° C. When the fifth water pump C5 is deactivated, operations of water vaporization for cooling reinforcement are halted to achieve water saving and energy saving effects. In contrast, the control unit 6 controls the fifth water pump P5 to accelerate an operation speed when the circulating water in the main tube bank 22 reaches a predetermined high temperature. The predetermined high temperature may be set based on requirements, and is generally 30° C. With the operating speed of the fifth water pump C5 is accelerated, the water vaporization and circulation capabilities are reinforced to increase the cooling efficiency.

With the above structures and architecture, in addition to the ability of adaptively regulating a building, the present invention also features both proactive cooling and heating effects. That is, energy conversion is achieved by the first gas-water energy conversion device 2 and the second gas-water energy conversion device 2" collaborating with the storage tank 4'. Operations of the heat source unit 5' are further combined. The heat source unit 5' is operated on the priority of achieving an internal energy balance of the building B, and is only proactively activated in the shortage of supply of energy conversion, such that operating power of the heat source unit 5' can be significantly saved. According to environmental requirements of the building B, energy needed for the air conditioning can be adjusted through different operation modes, including a cold-air circulation operation mode, a hot-air circulation operation mode, and an intermediate temperature operation mode to be described below (referring to FIG. 6).

Details of the cold-air circulation operation mode are given below. When an indoor temperature TA is greater than a cold-air supply value TA1, cold-air circulation is performed to provide cold air. At this point, indoor air is discharged via the wind discharging channel 201", and passes the water vaporizing device 204" to perform heat exchange. That is, the water vaporizing device 204" produces a pre-cooling effect on the air by energy conversion, such that sensible heat in the air discharged from indoors is transferred to lower the temperature through the endothermic effect provided by the water vaporization. Thus, the circulating water (i.e., the water from the storage tank 4') is also cooled and then returns to the storage tank 4' to lower the temperature of the stored water. The circulating water is further delivered to the first air heat exchanger 203" via the seventh pump P7 to provide a cooling effect and energy required for conversion when the incoming air passes through the first air heat exchanger 203". Further, the air discharged from the air discharging channel 201" passes through the water vaporizing device 204" and the second air heat exchanger 206" to again perform heat conversion. As such, the temperature of the air discharged to outdoors becomes far lower than the temperature of air that is directly discharged by a conventional air conditioner, thus lowering thermal pollution that discharged waste heat poses on the environment. In addition, the thermal load of the heat source unit 5' is also reduced, and so the power consumption of the heat source unit 5' is greatly decreased and the operation efficiency of the heat source unit 5' is enhanced. Therefore, while providing indoors with low-temperature and fresh air, the object of power saving is achieved. During cold-air circulation, the water stored in the storage tank 4' is first delivered to the heat source unit 5' via the sixth refrigerant pipe 506, cooled after having undergone heat exchange, returns to the storage tank 4' via the fifth refrigerant pipe 505, and undergoes heat exchange again with the water stored in the storage tank 4'. As a result, the water stored in the storage tank 4' is cooled to provide the heat source (cold energy) required by the second energy conversion device 2".

Details of the hot-air circulation operation mode are given below. When the indoor temperature TA is lower than a hot-air supply value TA2, the hot-air circulation is initiated to provide hot air. At this point, indoor air is discharged from the air discharging channel 201". As the temperature of the air discharged from indoors is higher, the water supply connecting pipe L1' stops supplying water and the water vaporizing device 204" stops operating, in a way that sensible heat in the air is transferred to increase the temperature. Meanwhile, the temperature of the circulating water in the second air heat exchanger 206" also rises, and the circulating water returns to the storage tank 4' to increase the temperature of the stored water. The water is delivered to the first air heat exchange 203" via the seventh water pump P7, so as to provide energy needed for preheating conversion when the incoming air passes through the first air heat exchanger 203". Further, the air discharged from the air discharging channel 201" passes through the water vaporizing device 204" and the second air heat exchanger 206" to again perform heat conversion. As such, thermal pollution that discharged waste heat poses on the environment is lowered. In addition, the thermal load of the heat source unit 5' is also reduced, and so the power consumption of the heat source unit 5' is greatly decreased and the operation efficiency of the heat source unit 5' is enhanced, thereby achieving the object of energy saving. During hot-air circulation, the water stored in the storage tank 4' is first delivered to the heat source unit 5' via the sixth refrigerant pipe 506, heated after having undergone heat exchange, returns to the storage tank 4' via the fifth refrigerant pipe 505, and undergoes heat exchange again with the water stored in the storage tank 4'. As a result, the water stored in the storage tank 4' is heated to provide the heat source (heat energy) required by the second energy conversion device 2".

Details of the intermediate temperature operation mode are given below. When the indoor temperature TA is within an intermediate temperature range (i.e., a most comfortable indoor temperature range of 23° C. to 26° C. in summer, and 18° C. to 20° C. in winter, and an outdoor temperature range of 15° C. to 18° C.) between the hot-air supply value TA2 and the cold-air supply value TA1, the air conditioner need not be activated for cooling or heating. Instead, only the first gas-water energy conversion device 2" is operated to perform energy conversion between external air and indoors and to supply fresh air and to acquire a pleasant indoor ambient temperature. There are two scenarios of energy utilization and conversion. In the first scenario, with the operations of the second gas-water energy conversion device 2", the water having a high temperature (above 28° C.) stored during daytime (or summer) in the storage tank 4' is delivered to the first air heat exchanger 203" (providing a pre-cooling effect (in summer) when the external air enters the wind receiving channel 202", and providing pre-heating in winter) via the seventh water pump P7 at the fourth water discharging pipe L7, enters via the water entrance end 203a", exits the water exit end 203b", and returns to the storage tank 4' via the fourth water receiving pipe L6. Further, the storage tank 4' supplies the water going out through the water holes L11" of the water supply connecting pipe L1" via the ninth water pump P9, and the outgoing water is sprinkled on the water vaporizing device 204" to produce water vaporization and endothermic effects. The outgoing water is then cooled and collected at the water collecting pan 205" (at this point, the temperature of the discharged air in the wind discharging channel 201" is reduced due to water vaporization and endothermic effects), and returns to the storage tank 4' via the water discharging pipe L3 and the first water receiving pipe L1. After the water with a lower temperature returns to the storage tank 4', the water stored in the storage tank 4' is cooled due to heat exchange. Further, when the discharged air passes through the second air heat exchanger 206", the eighth water pump P8 at the fifth water discharging pipe L9 sends the water stored in the storage tank 4' to the second air heat exchanger 206" for heat exchange with the discharged air, and the water having undergone heat exchange returns to the storage tank 4' via the fifth water receiving pipe L8. As a result of heat exchange, the temperature of the water is lowered (in summer, whereas a heating effect is provided in winter), such that the water stored in the storage tank 4' also cooled as a result of heat exchange. When the temperature drops during nighttime, with the energy conversion of the second energy conversion device 2", the temperature (approximately at 20° C.) of the water that returns to the storage tank 4' and undergoes heat exchange is also lower than that during the daytime. By employing such energy storage means, the water having a lower temperature stored during the nighttime may be utilized for energy conversion for a high-temperature environment (above 28° C.) in the daytime. Thus, the high-temperature external air may be converted to a comfortable incoming air and to refill fresh air for satisfying requirements in the building B, thereby obtaining a pleasant indoor ambient temperature. In the second scenario, in a low-temperature (below 15° C.) environment during the nighttime (or in winter), the water stored in the storage tank 4' is heated by the second air heat exchanger 206" during the day and then stored for the use of a low-temperature environment in the nighttime. When the water passes through the second heat exchanger 206", the eighth water pump P8 at the fifth water discharging pipe L9 delivers the water stored in the storage tank 4' to the second air heat exchanger 206" for heat exchange with the discharged air, and the water then returns to the storage tank 4' via the fifth water receiving pipe L8. At this point, the temperature of the water rises due to heat exchange, and the temperature of the water stored in the storage tank 4 also increases due to heat exchange. When the temperature rises during the daytime, with the energy conversion of the second energy conversion device 2", the temperature (approximately at 20° C.) of the water that returns to the storage tank 4' and having undergone heat exchange is also higher than that during the nighttime. By employing such energy storage means, the water having a higher temperature stored during the daytime may be utilized for energy conversion for a low-temperature environment (below 15° C.) in the nighttime. Thus, the low-temperature external air may be converted to a comfortable incoming air and to refill fresh air for satisfying requirements in the building B, thereby obtaining a pleasant indoor ambient temperature.

Further, in the present invention, to ensure that no bacteria grows in circulating water in the water collecting chamber 25, the water collecting chamber 25 may be connected to a sterilizer K. For example, the sterilizer K is an ultraviolet lamp tube (or an odor machine or a negative ion machine).

Further, in the present invention, a sewage device N is connected to the bottom portion of the water collecting pan 241. The sewage device N is further connected to an overflow pipe L3 provided with a manual valve V. The manual valve V is opened to discharge sewage and sediment in the water collecting pan 241 as desired, and closed when the sewage and sediment are discharged. In addition to discharging sewage and sediment, the overflow pipe L3 may also serve as an overflow discharge channel of the water collecting pan 241.

In conclusion, the water energy conversion system of the present invention employs water as a basis and a carrier for energy conversion. By utilizing the first and second energy conversion devices collaborating with the storage tank for energy conversion, energy is stored in the storage tank. Operations of the heat source unit are further combined. Apart from creating a healthy and comfortable indoor environment, an energy balance with the nature is maintained in accordance with the nature. Meanwhile, multiple effects of water storage, water supply, energy conservation, disaster prevention and energy storage as well as localization application and balancing of water energy conversion are achieved.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A water energy conversion system, at least comprising:
   a control unit, configured to operations of the entire system, connected to a power supply system;
   a first gas-water energy conversion device, comprising:
   a housing, being a hollow cylindrical body, comprising an internal accommodating chamber, a wind outlet at a top portion thereof and at least one wind inlet at a periphery thereof;
   a cooling fan, disposed at the wind outlet of the housing, controlled by the control unit;
   a main tube bank, disposed below the cooling fan, formed by at least one coil, the coil having a water entrance end connected to a first water discharging pipe and a water exit end connected to a first water receiving pipe;
   an air pre-cooling water tube bank, disposed at one side below the main tube bank, formed by at least one coil, the coil having a water entrance end connected to a main connecting pipe and a water exit end connected to a water sprinkling pipe;
   a water vaporizer, installed right below the main tube bank, being a mist cooling device that generates an endothermic effect through water vaporization, having at least one side located at a water sprinkling region of the water sprinkling pipe, provided with a water collecting pan below, the water collecting pan being connected to a water collecting connecting pipe; and
   a water collecting chamber, disposed below the water vaporizer, being an enclosed chamber and being in communication with the water collecting pan via the water collecting connecting pipe, connected to the main connecting pipe via a water delivering connecting pipe provided with a fifth water pump, the fifth water pump being connected to and controlled by the control unit;
   a second gas-water energy conversion device, comprising:
   a wind discharging channel and a wind receiving channel, the wind discharging channel having one side provided with a wind outlet and one other side provided with a wind inlet, the wind discharging channel internally provided with a first fan motor group, the wind receiving channel having one side provided with a wind inlet and one other side provided with a wind outlet, the wind receiving channel being provided with a second fan motor group;
   a first air heat exchanger, disposed at one side of the wind receiving channel, being a heat exchanging device formed by a coil, having a water entrance end and a water exit end, the water entrance end being connected to a first water discharging branch pipe provided with a seventh control valve, the water exit end being connected to a first water receiving branch pipe;
   a water vaporizing device, installed at one side of the wind discharging channel, being mist cooling device that generates an endothermic effect through water vaporization, having a top portion receive water sprinkled from a plurality of water holes at an end section of a water supply connecting pipe, the water supply connecting pipe being provided with a fourth water pump, the water vaporizing device being provided with a water collecting pan below, the water collecting pan being connected to the water discharging pipe, the water discharging pipe having one other connected to the first water receiving branch pipe; and a second air heat exchanger, disposed at one side of the wind discharging channel, being a heat exchanging device formed by a coil, having a water entrance end and a water exit end, the water entrance end being connected to a second water discharging pipe provided with a third water pump and a sixth control valve, the water exit end being connected to a second water receiving pipe;

a water supply device, configured to collect water sources and to categorize the collected water for different usage purposes, all of the water sources entering the water supply device via at least one water feeding connecting pipe and delivered to a storage tank via a third water receiving pipe, the water supply device further configured to deliver the water stored in the storage tank to the water supply device via a third water discharging pipe provided with a first water pump and a second control valve, the water supply device further being connected to at least one water supply pipe for supplying water of different needs;

the storage tank, being an enclosed chamber, comprising a plurality of water pick outlets, the plurality of water pick outlet comprising a first water pick outlet, a second water pick outlet, a third water pick outlet, a fourth water pick outlet, a fifth water pick outlet, and a sixth water pick outlet, the first water pick outlet being connected to the third water receiving pipe, the second water pick outlet being connected to the third water discharging pipe, the third water pick outlet being connected to the first water receiving pipe that is branch connected to the first water receiving branch pipe, the fourth water pick outlet being connected to the first water discharging pipe, the first water discharging pipe being provided with a second water pump and an eighth control valve and branch connected to the first water discharging branch pipe, the first water discharging branch pipe being provided with a seventh control valve, the fifth water pick outlet being connected to the second water receiving pipe, the sixth water pick outlet being connected to the second water discharging pipe; and a heat source unit, being a direct expansion heat source unit, controlled by the control unit, comprising:

a heat source device, serving as a power source of refrigerant transmission, configured to provide a heat source;

a first heat exchanger, disposed in the wind receiving channel, configured to perform heat exchange of heat absorption or heat dissipation on air passing therein, a first access end of the first heat exchanger being connected to the heat source device via a third refrigerant pipe and receiving an input of the heat source, a second access end of the first heat exchanger being connected to the heat source device via a fourth refrigerant pipe; and a second heat exchanger, disposed in the wind discharging channel, configured to perform heat exchange of heat dissipation or heat absorption on air passing therein, a third access end of the second heat exchanger being connected to the heat source device via a first refrigerant pipe and receiving an input of the heat source, the fourth access end of the second heat exchanger being connected to the heat source device via a second refrigerant pipe.

2. The water energy conversion system according to claim 1, wherein the water collecting chamber is provided with a water level sensor and is externally connected to a water fill pipe, the water fill pipe is provided with a third control valve, and the water level sensor and the third control valve are connected to and controlled by the control unit.

3. The water energy conversion system according to claim 1, wherein the storage tank is provided with a water level detector configured to detect a water level of water stored in the storage tank.

4. The water energy conversion system according to claim 1, wherein the third water receiving pipe is provided with a first control valve and is connected to a release pipe, and the release pipe is provided with a fourth control valve.

5. The water energy conversion system according to claim 1, wherein the third water discharging pipe is further connected to an unload pipe provided with a fifth control valve.

6. A water energy conversion system, at least comprising:

a control unit, configured to operations of the entire system, connected to a power supply system;

a first gas-water energy conversion device, comprising:

a housing, being a hollow cylindrical body, comprising an internal accommodating chamber, a wind outlet at a top portion thereof and at least one wind inlet at a periphery thereof;

a cooling fan, disposed at the wind outlet of the housing, controlled by the control unit;

a main tube bank, disposed below the cooling fan, formed by at least one coil, the coil having a water entrance end connected to a first water discharging pipe and a water exit end connected to a first water receiving pipe;

an air pre-cooling water tube bank, disposed at one side below the main tube bank, formed by at least one coil, the coil having a water entrance end connected to a main connecting pipe and a water exit end connected to a water sprinkling pipe; the water sprinkling pipe is provided with at least one water sprinkling hole;

a water vaporizer, installed right below the main tube bank, being a mist cooling device that generates an endothermic effect through water vaporization, having at least one side located at a water sprinkling region of the water sprinkling pipe, provided with a water collecting pan below, the water collecting pan being connected to a water collecting connecting pipe; and a water collecting chamber, disposed below the water vaporizer, being an enclosed chamber and being in communication with the water collecting pan via the water collecting connecting pipe, connected to the main connecting pipe via a water delivering connecting pipe provided with a fifth water pump, the water collecting chamber being provided with a water level sensor and externally connected to a water fill pipe, the water fill pipe being provided with the third control valve, the water level sensor, the third control valve and the fifth water pump being connected to and controlled by the control unit;

a second gas-water energy conversion device, comprising:

a wind discharging channel and a wind receiving channel, the wind discharging channel having one side provided with a wind outlet and one other side provided with a wind inlet, the wind discharging channel internally provided with a first fan motor group, the wind receiving channel having one side provided with a wind inlet and one other side provided with a wind outlet, the wind receiving channel being provided with a second fan motor group;

a first air heat exchanger, disposed at one side of the wind receiving channel, being a heat exchanging device formed by a coil, having a water entrance end and a water exit end, the water entrance end being connected to a fourth water discharging pipe provided with a seventh water pump and a tenth control valve, the water exit end being connected to a fourth water receiving branch pipe;

a water vaporizing device, installed at one side of the wind discharging channel, being mist cooling device that generates an endothermic effect through water vaporization, having a top portion receive water sprinkled from a plurality of water holes at an end section of a water supply connecting pipe, the water supply connecting pipe being provided with a ninth water pump, the water vaporizing device being provided with a water collecting pan below, the water collecting pan being connected to a water discharging pipe, the water discharging pipe having one other end connected to a fourth water receiving pipe; and a second air heat exchanger, disposed at one side of the wind discharging channel, being a heat exchanging device formed by a coil, having a water entrance end and a water exit end, the water entrance end being connected to a fifth water discharging pipe provided with an eighth water pump and a tenth control valve, the water exit end being connected to a fifth water receiving pipe;

a water supply device, configured to collect water sources and to categorize the collected water for different usage purposes, all of the water sources entering the water supply device via at least one water feeding connecting pipe and delivered to a storage tank via a third water receiving pipe, the water supply device configured to further deliver the water stored in the storage tank to the water supply device via a third water discharging pipe provided with a first water pump and a second control valve, the water supply device further being connected to at least one water supply pipe for supplying water of different needs;

the storage tank, being an enclosed chamber, comprising a plurality of water pick outlets, the plurality of water pick outlet comprising a first water pick outlet, a second water pick outlet, a third water pick outlet, a fourth water pick outlet, a fifth water pick outlet, a sixth water pick outlet, a seventh water pick outlet, an eighth water pick outlet, a ninth water pick outlet and a tenth water pick outlet, the first water pick outlet being connected to the third water receiving pipe, the second water pick outlet being connected to the third water discharging pipe, the third water pick outlet being connected to the first water receiving pipe, the fourth water pick outlet being connected to the first water discharging pipe provided with a second water pump and an eighth control valve, the fifth water pick outlet being connected to a fifth refrigerant pipe, the sixth water pick outlet being connected to a sixth refrigerant pipe provided with a sixth water pump and a ninth control valve, the seventh water pick outlet being connected to the fourth water receiving pipe, the eighth water pick outlet being connected to the fourth water discharging pipe provided with a seventh water pump and a tenth control valve, the ninth water pick outlet being connected to the fifth water receiving pipe, and the tenth water pick outlet being connected to the fifth water discharging pipe provided with an eighth water pump and an eleventh control valve; and a heat source unit, being a direct expansion heat source unit, controlled by the control unit, connected to the storage tank via the sixth refrigerant pipe and receiving an input of stored water to provide a heat source for heat exchange, the stored water having undergone heat exchange returning to the storage tank via the fifth refrigerant pipe.

7. The water energy conversion system according to claim 6, wherein the water collecting chamber is provided with a water level sensor and is externally connected to a water fill pipe, the water fill pipe is provided with a third control valve, and the water level sensor and the third control valve are connected to and controlled by the control unit.

8. The water energy conversion system according to claim 6, wherein the storage tank is provided with a water level detector configured to detect a water level of water stored in the storage tank.

9. The water energy conversion system according to claim 6, wherein the third water receiving pipe is provided with a first control valve and is connected to a release pipe, and the release pipe is provided with a fourth control valve.

10. The water energy conversion system according to claim 6, wherein the third water discharging pipe is further connected to an unload pipe provided with a fifth control valve.

* * * * *